US008312147B2

(12) United States Patent
Kaufman et al.

(10) Patent No.: US 8,312,147 B2
(45) Date of Patent: Nov. 13, 2012

(54) MANY-TO-ONE MAPPING OF HOST IDENTITIES

(75) Inventors: Matthew Kaufman, Bonny Doon, CA (US); Michael Thornburgh, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 406 days.

(21) Appl. No.: 12/120,231

(22) Filed: May 13, 2008

(65) Prior Publication Data

US 2009/0287826 A1  Nov. 19, 2009

(51) Int. Cl.
G04F 15/16 (2006.01)
H04L 12/28 (2006.01)
(52) U.S. Cl. ............... 709/227; 709/206; 370/392
(58) Field of Classification Search .......... 709/227
See application file for complete search history.

(56) References Cited

U.S. PATENT DOCUMENTS

| | | | |
|---|---|---|---|
| 4,475,192 A | 10/1984 | Fernow et al. | |
| 5,774,660 A | 6/1998 | Brendel et al. | |
| 5,857,072 A | 1/1999 | Crowle | |
| 6,138,120 A * | 10/2000 | Gongwer et al. | 1/1 |
| 6,338,089 B1 * | 1/2002 | Quinlan | 709/227 |
| 6,563,793 B1 * | 5/2003 | Golden et al. | 370/236 |
| 7,039,916 B2 | 5/2006 | Jason, Jr. | |
| 7,111,162 B1 * | 9/2006 | Bagepalli et al. | 713/151 |
| 7,246,356 B1 | 7/2007 | Lozben et al. | |
| 7,274,706 B1 | 9/2007 | Nguyen et al. | |
| 7,305,486 B2 | 12/2007 | Ghose et al. | |
| 7,403,945 B2 | 7/2008 | Lin et al. | |
| 7,448,080 B2 * | 11/2008 | Karjala et al. | 726/15 |
| 7,600,113 B2 * | 10/2009 | Kuehnel et al. | 713/155 |
| 7,603,454 B2 | 10/2009 | Piper et al. | |
| 2002/0010783 A1 | 1/2002 | Primak et al. | |
| 2002/0065912 A1 * | 5/2002 | Catchpole et al. | 709/224 |
| 2003/0135625 A1 * | 7/2003 | Fontes et al. | 709/228 |
| 2003/0163702 A1 | 8/2003 | Vigue et al. | |
| 2004/0039906 A1 | 2/2004 | Oka et al. | |
| 2004/0064568 A1 * | 4/2004 | Arora et al. | 709/228 |
| 2004/0193461 A1 | 9/2004 | Keohane et al. | |
| 2004/0268142 A1 * | 12/2004 | Karjala et al. | 713/200 |
| 2005/0097222 A1 * | 5/2005 | Jiang et al. | 709/245 |
| 2005/0188193 A1 * | 8/2005 | Kuehnel et al. | 713/155 |
| 2005/0198634 A1 | 9/2005 | Nielsen et al. | |
| 2006/0041745 A1 | 2/2006 | Parnes | |
| 2006/0101081 A1 | 5/2006 | Lin et al. | |
| 2006/0215652 A1 | 9/2006 | Strandridge et al. | |
| 2006/0248195 A1 | 11/2006 | Toumura et al. | |

(Continued)

OTHER PUBLICATIONS http://en.wikipedia.org/wiki/Gnutella, May 5, 2008, 8 pages.

(Continued)

Primary Examiner — Mohamed Ibrahim
Assistant Examiner — Joiya M Cloud
(74) Attorney, Agent, or Firm — Fish & Richardson P.C.

(57) ABSTRACT

A computer-implemented method includes sending, from a first node to a second node, an initiator message to open a connection between the first node and the second node, receiving, at the first node, a responder message sent from the second node, in which the responder message comprises a responder certificate, converting the responder certificate to a responder canonical identifier, comparing the responder canonical identifier to a stored canonical identifier, and establishing the connection between the first node and the second node over a pre-existing session corresponding to the stored canonical identifier, when the responder canonical identifier matches the stored canonical identifier.

15 Claims, 6 Drawing Sheets

U.S. PATENT DOCUMENTS

| | | | |
|---|---|---|---|
| 2006/0256711 | A1 | 11/2006 | Kusama et al. |
| 2007/0086357 | A1 | 4/2007 | Okmianski et al. |
| 2007/0234422 | A1 | 10/2007 | Piesing |
| 2007/0234428 | A1 | 10/2007 | Rash et al. |
| 2008/0040226 | A1 | 2/2008 | Roker |
| 2008/0075048 | A1 | 3/2008 | Suszko |
| 2008/0280623 | A1 | 11/2008 | Danne et al. |
| 2008/0301219 | A1 | 12/2008 | Thornburgh et al. |
| 2009/0150534 | A1 | 6/2009 | Miller et al. |
| 2009/0164774 | A1 | 6/2009 | Sherkin |
| 2009/0249074 | A1 | 10/2009 | Madhavan et al. |
| 2010/0015960 | A1 | 1/2010 | Reber |

OTHER PUBLICATIONS http://en.wikipedia.org/wiki/BitTorrent_%28protocol%29, May 5, 2008, 13 pages.

http://en.wikipedia.org/wiki/Kazaa, May 3, 2008, 7 pages.

Cooper, D., et al., "Internet X.509 Public Key Infrastructure Certificate and Certificate Revocation List (CRL) Profile," Standards Track, Network Working Group, May 2008, 151 pages.

Menezes et al., "Handbook of Applied Cryptography," CRC Press, 321-383 (1996).

Federal Information Processing Standards "Secure Hash Standard" Publication 180-2, Aug. 1, 2002, downloaded from the internet at http://csrc.nist.gov/publications/fips/fips180-2/fips180-2.pdf on May 9, 2008, 75 pages.

Housley, "Internet X.509 Public Key Infrastructure Certificate and Certificate Revocation List (CRL) Profile", Apr. 2002, downloaded from the internet at http://www.ietf.org/rfc/rfc3280.tx?number=3280 on Dec. 5, 2007, 127 pages.

International Standards Organization "ISO/IEC 9796-2 Information Technology, Security Techniques, Digital Signature Schemes, Giving Message Recovery" International Organization for Standards ISO/IEC 9796-2:2002/Amd.1:2008, Oct. 1, 2002 and Amendment of Jan. 15, 2008, 61 pages.

Kaufman, et al. "The Secure Media Flow Protocol—Version 1" Amicima, Inc., 2004, downloaded from the internet at http://web.archive.org/web/20060211083929/www.amicima.com/downloads/documentation/protocol-doc-20051216.txt on Apr. 10, 2007, 14 pages.

Rescorla, "Diffie-Hellman Key Agreement Method", Network Working Group, Request for Comments: 2631, Jun. 1999, downloaded from the internet at http://www.ietf.org/rfc/rfc263.txt on May 13, 2008, 13 pages.

RSA Security, Inc. "PKCS #1 v.2.1: RSA Cryptography Standard", downloaded from the internet at , http://www.rsa.com/rsalabs/node.asp?id=2125 on May 13, 2008, 61 pages.

Thornburgh, et al. "Endpoint Discriminator in Network Transportation Protocol Startup Packets", U.S. Appl. No. 11/779,165, filed Jul. 17, 2007, 32 pages.

International Search Report and Written Opinion, mailed Oct. 28, 2008 in matter PCT/US08/063739, 9 pages.

International Preliminary Report on Patentability, mailed Jan. 28, 2010 in matter PCT/US08/063739, 7 pages.

Gupta et al., "A Client Oriented, IP Level Redirection Mechanism," 1999, IEEE, pp. 1461-1469.

English translation of Chinese Office Action dated Nov. 24, 2011, issued in corresponding Chinese Application No. 200980100435.0.

Final Office Action mailed on May 9, 2012 in corresponding U.S. Appl. No. 12/120,229.

* cited by examiner

MANY-TO-ONE MAPPING OF HOST IDENTITIES

BACKGROUND

The present disclosure relates to identifying host computer systems. To establish a session between two separate nodes in a communication network, a first node, represented by a first identifier, may transmit one or more initial startup messages to a desired endpoint node. The desired endpoint node can initiate the session by responding to the startup message with a responder message. In some cases, however, a pre-existing session may already have been established with a second node, represented by a second identifier, in which the desired endpoint node and second nodes correspond to the same host.

SUMMARY

This specification describes technologies relating to many-to-one mapping of host identities. In general, one aspect of the subject matter described in this specification can be embodied in a computer-implemented method that includes sending, from a first node to a second node, an initiator message to open a session between the first node and the second node, receiving, at the first node, a responder message sent from the second node, in which the responder message includes a responder certificate, converting the responder certificate to a responder canonical identifier, comparing the responder canonical identifier to a stored canonical identifier and establishing the session between the first node and the second node over a pre-existing session corresponding to the stored canonical identifier, when the responder canonical identifier matches the stored canonical identifier. Other embodiments of this aspect include corresponding computing platforms and computer program products.

These and other embodiments can optionally include one or more of the following features. The initiator message can include an endpoint discriminator. The responder message can include information matching the endpoint discriminator provided in the initiator message. In some implementations, the method can include comparing information contained in the responder message with an endpoint discriminator provided in the initiator message and confirming that the responder certificate was sent by the second node when the information contained in the responder message matches the endpoint discriminator provided in the initiator message.

In some cases, converting the responder certificate can include converting the responder certificate to the responder canonical identifier after confirming that the responder certificate was sent by the second node. The responder canonical identifier can include a cryptographic hash of the responder certificate. In some examples, comparing the responder canonical identifier includes comparing the responder canonical identifier to multiple stored canonical identifiers indexed to multiple pre-existing sessions.

In some implementations, the method can include opening a new session between the first node and the second node, when the responder canonical identifier does not match the stored canonical identifier. In certain cases, the method can include indexing the responder canonical identifier to the new session, when the responder canonical identifier does not match the stored canonical identifier.

The method can include terminating a session setup between the first node and the second node, when the responder canonical identifier matches the stored canonical identifier. The responder message can be sent from the second node in response to receipt of the initiator message at the second node.

Particular embodiments of the subject matter described in this specification can be implemented to realize one or more of the following advantages. Competition for resources can be reduced given that multiple separate and parallel sessions between a pair of nodes can be combined into a single session. Delivery of data in the single session can be prioritized to increase communication speed, timeliness and efficiency. Communication efficiency also can be improved given that it is not necessary to negotiate encryption properties between nodes more than once.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
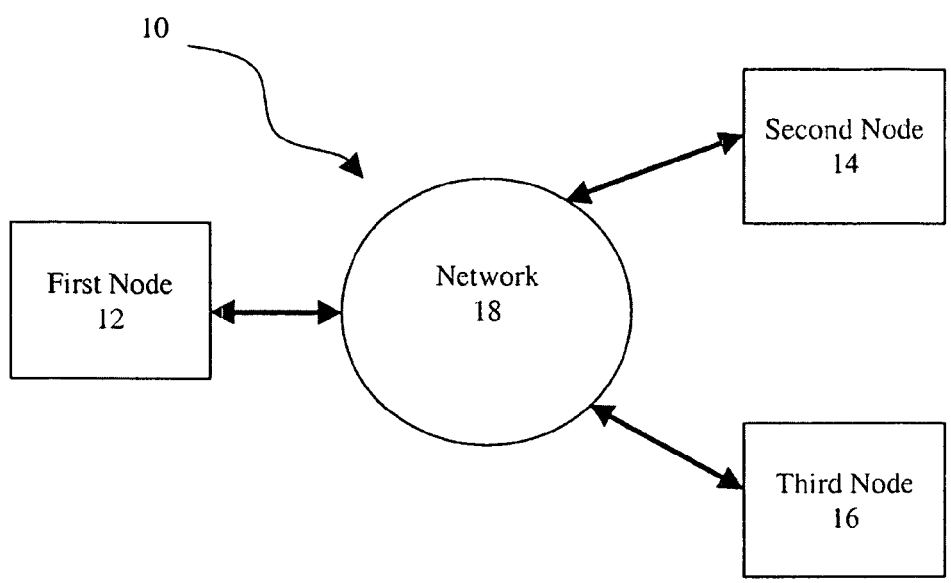
FIG. 1 is an example of a network environment.

FIG. 1 shows an example of a network environment 10 in which data and information are transferred among one or more nodes coupled to a network 18. Each node connected to the network 18 is an entity, such as a hardware device or software hosted on a hardware device, that is capable of transmitting and receiving information over data transmission media. A node can include, but is not limited to, a client or a server hosted on a computing platform in a client-server environment or a peer in a peer-to-peer network. Examples of computing platforms include personal computers, mobile telephones, personal digital assistants, among others. A node may be hosted on its own associated computing platform, which is distinct from computing platforms hosting other nodes. Alternatively, or in addition, two or more nodes may be hosted on a single computing platform.

Each client and server can include one or more processes that are communicatively coupled to the network 18 through a communication adapter (not shown) associated with a particular computing platform. Examples of processes on a client or server node include, but are not limited to, e-mail applications, web browsers, document processing programs and media players. Examples of servers include web servers, print servers, e-mail servers, multimedia content servers adapted to distribute audio or video content, and/or the FLASH® Media Server provide by Adobe Systems Incorporated of San Jose, Calif., among others.

As shown in the example of FIG. 1, the network environment 10 includes a first node 12, one or more second nodes 14 and one or more third nodes 16 connected to the network 18. To communicate and exchange information between the first node 12 and the second node 14, a session between the first node 12 and second node 14 is established. A session relates to a period during which nodes communicate over a network to perform one or more tasks, operations and/or functions, and state information is stored (at one or both of the nodes) regarding the communications over the network. A session can be established between two nodes, such as a client and a server for the transmission of information on top of any one of several communication protocols including, for example, connection oriented protocols such as Transmission Control Protocol over Internet Protocol (TCP/IP) or connectionless network protocols such as User Datagram Protocol over Internet Protocol (UDP/IP).

Figure 2:
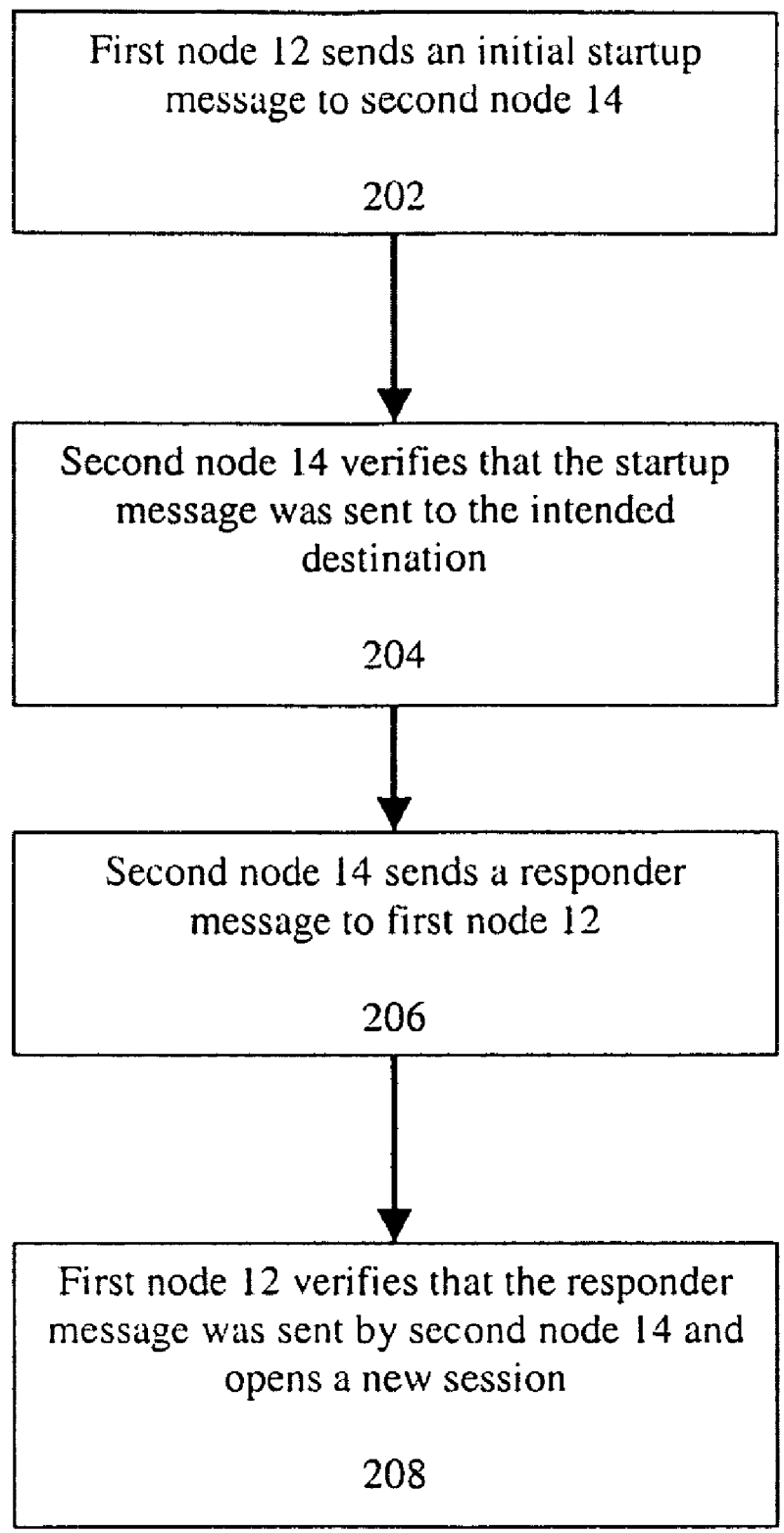
FIG. 2 is a flow-diagram of the process of establishing a session between two nodes.

FIG. 2 is a flow-diagram of a process of establishing a session between the first node 12 and the second node 14. As part of establishing the session, the first node 12, acting as an initiating node, sends (202) an initial startup message to the second node 14, acting as a receiving node. Upon receiving the startup message, the second node 14 verifies (204) that the message has been sent to the intended destination. For example, the startup message can include a host identifier, such as an endpoint discriminator, which identifies the intended recipient. An endpoint discriminator is data used during connection setup between nodes. The endpoint discriminator can include a block of data formatted in a sequence of length/tag/value units. The endpoint discriminator can encode one or more properties of the desired endpoint, i.e., the receiving node. For example, the endpoint discriminator can encode that the desired endpoint can be a "server" and a "name" associated with the server. In some implementations, the endpoint discriminator can encode that the desired endpoint can be "any server" without requiring a particular identification of the server. Other properties of the endpoint node can be encoded, as well. The length/tag/value units may be the encoding, or a part of the encoding, of the properties of the desired endpoint.

The second node 14 can compare the endpoint discriminator with its own host identity to determine whether the message was sent to the correct destination. If the startup message was delivered correctly to the second node 14, the second node 14 then sends (206) a response message back to the first node 12. The first node 12 verifies (208) that the response message was sent by the second node 14 and subsequently opens a new session that includes a connection between the first node 12 (initiating node) and the second node 14 (receiving node).

Figure 3:
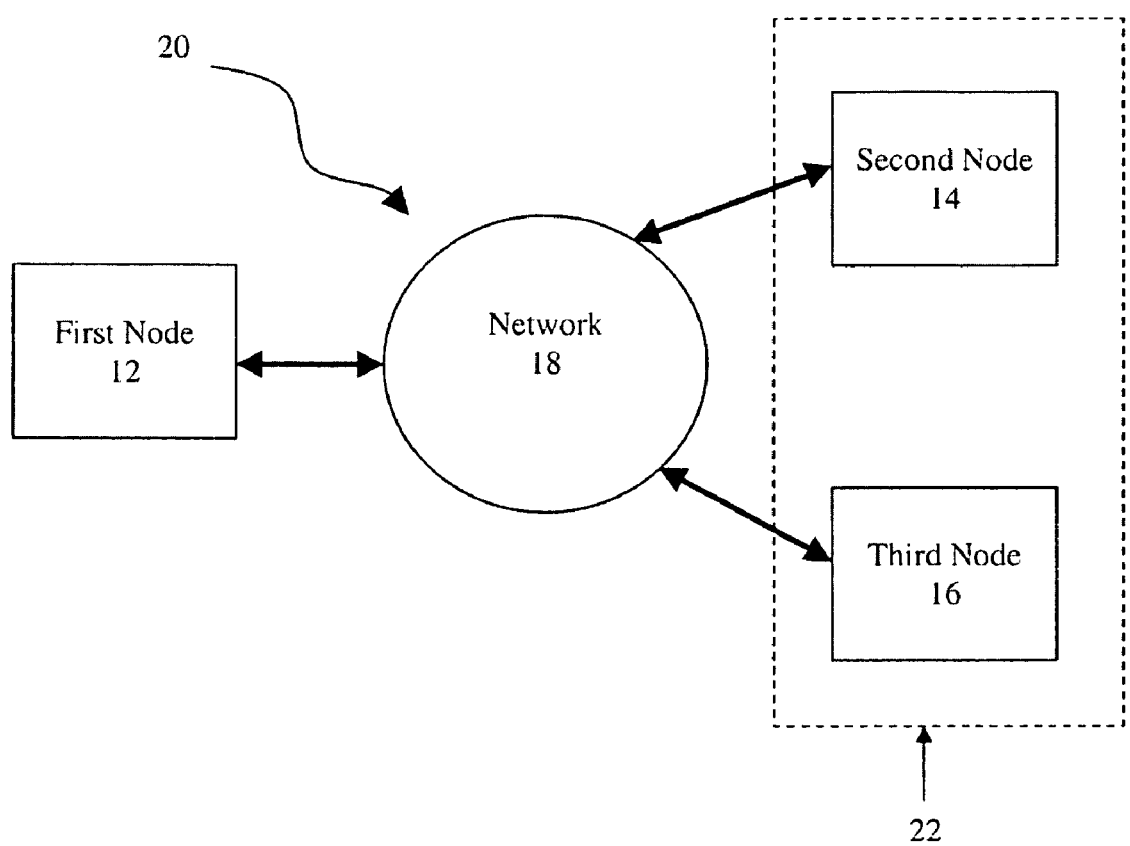
FIG. 3 is an example of a network environment.

In some cases, however, the first node 12 may have already established a session with another node, in which the other node and the second node 14 correspond to the same entity. For example, FIG. 3 shows a network environment 20 in which the second and third nodes 14, 16 are virtual nodes, each addressable through a different endpoint discriminator. Both the second and third nodes 14, 16 are supported on entity 22, which can correspond to a single hardware device, such as a computer, or software environment, such as an operating system. If the first node 12 has already established a session with the third node 16, then the opening of a new session with second node 14 would lead to two separate parallel sessions running on the same entity 22. This situation can have undesirable consequences including, but not limited to, a reduction in network efficiency due to competition for resources between the two sessions, redundant negotiation of encryption properties, and poor data prioritization resulting in less timely delivery of high priority data.

The foregoing disadvantages can, in some implementations, be avoided by establishing a session between the first node 12 and the second node 14 over the pre-existing session. For example, a new session between the first node 12 and second node 14 can be bound to the existing session between the first node 12 and third node 16 in a single pre-established session. That is, the host identities of nodes 14, 16 are mapped to a single canonical identifier (i.e., a canonical endpoint discriminator) that is representative of the hardware device or software environment on which nodes 14, 16 are established. Additional connections to other virtual nodes operating off of entity 22 may also be mapped in the foregoing manner. In this way, the pre-established session can be reused without the need to create a separate new session to the entity 22. In some implementations, binding connections within a single session may increase network communication speed and efficiency. For example, the transmission of data packets in the session can be prioritized between two or more separate connections. Additionally, it is not necessary to apply encryption for multiple parallel sessions. Instead, encryption is applied once at the beginning of the existing session.

To determine whether an initiating node has already established a session with a receiving node, the initiating node can check the responder message to see if the information included in the responder message corresponds to a canonical endpoint discriminator. The canonical endpoint discriminator is the canonical identifier used to represent the hardware device or software environment from which the responder message is sent. Each pre-established session, in which the first node 12 takes part, can be indexed to a canonical endpoint discriminator. To bind a new session to a pre-established session, the initiating node can check whether the canonical endpoint discriminator sent with or derived from a responder message matches a canonical endpoint discriminator associated with the pre-established session. If a match exists, the initiating node maps the receiving node to the canonical endpoint discriminator associated with the pre-established session. If no match exists, a new session is created between the first node 12 and second node 14. The canonical endpoint discriminator corresponding to the information received in the responder message then is assigned to the new session.

Figure 4:
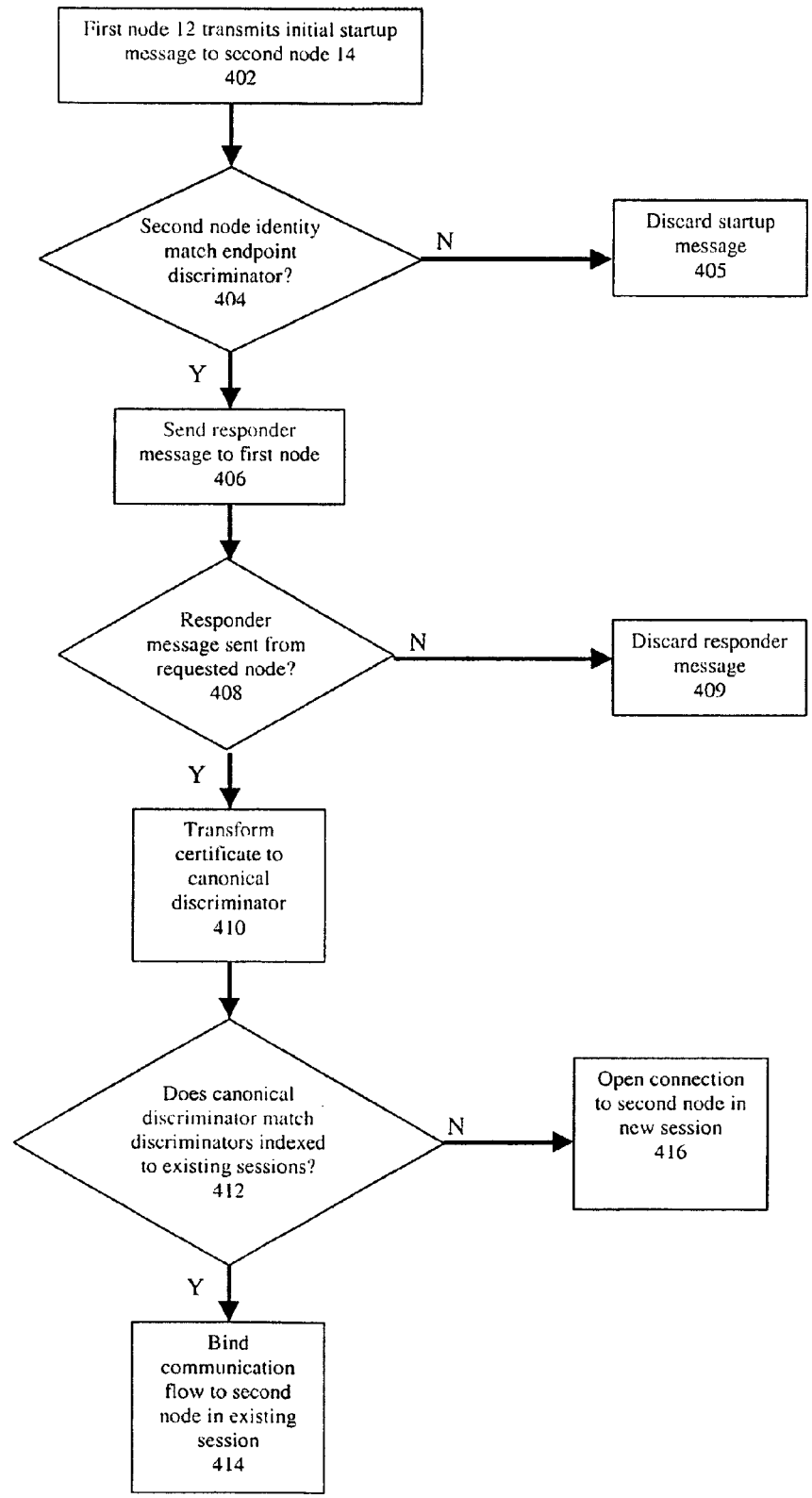
FIG. 4 is a flow diagram of a process associated with actions of a node determining whether to bind a new connection to a pre-established session.

FIG. 4 is a flow diagram of a process associated with actions of the first node 12 determining whether to map the second node 14 to the canonical endpoint discriminator associated with a pre-established session. Prior to transmitting a connection startup message, the first node 12 learns the node identity and network address of the node with which it wishes to connect. The node identity can be data formed by hashing a node certificate associated with each node. A node certificate is a formatted block of data that contains information identifying the node with which it is associated. For example, in some implementations, a first user logs in to a server on the network such that an ephemeral node identity is mapped to the username of the first user. When a second user desires to contact the first user, a query may be sent to the server to retrieve the node identity and network address corresponding to the particular user name of the first user.

Figure 5:
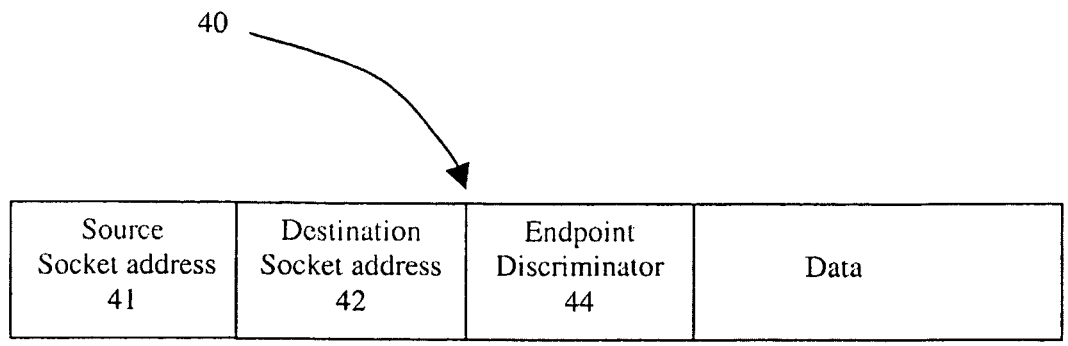
FIG. 5 is an example of an initial startup packet.

Having obtained the node identity and network address, the first node 12 then can compose and transmit (402) an initial startup message to the second node 14. An example of a initial startup message 40 is shown in FIG. 5. The initial startup message 40 can be formatted according to a protocol such as, for example, an Internet Protocol for transmission from a source to a destination. The startup message 40 can include a source socket address 41 identifying the initiating node (e.g., first node 12), and a destination socket address 42 and an endpoint discriminator 44 identifying the receiving node (e.g., second node 14).

The endpoint discriminator 44 can include information representing a node's identity, such as a Uniform Resource Locator (URL), Uniform Resource Name (URN), domain names and/or similar information that identifies a particular node, resource and/or entity. Such information may comprise a string of characters, for example. Additionally, although not necessarily, an endpoint discriminator may be independent of any particular network address. The endpoint discriminator 44 can allow a recipient of the startup message 40 to readily determine the identity of the desired endpoint. In implementations where a session has already been established between the first node 12 and the second node 14, messages between the nodes can include an endpoint discriminator 44 that is derived as a function of the node identity or a particular resource. For example, the endpoint discriminator 44 can be a cryptographic hash of information that represents the receiving node identity. Additionally, the endpoint discriminator 44 can be used to identify groups of nodes as opposed to individual nodes. Additional information about endpoint discriminators can be found in U.S. patent application Ser. No. 11/779,165.

Referring again to FIG. 4, the second node 14, upon receiving the startup message, can determine (404) whether the endpoint discriminator included in the startup message is correct. The endpoint discriminator can be composed of one or more length/tag/value fields. The receiving node 14 can parse the length/tag/value fields looking for a predefined value such as the receiving node identity, a hostname or a field that specifies a particular type of server. Other predefined values may be included, as well. For example, if one of the fields specifies that "any server" is acceptable, then, in order to respond, the receiving node should be a server. In another example, if an identity value was included in one of the fields, then the identity should match the identity of the second node 14. Alternatively, if the hostname field was included in the endpoint discriminator, then the hostname value should match the hostname of the second node 14.

If the second node 14 determines that the endpoint discriminator does not match, the startup message can be discarded (405) such that no connection is established. Alternatively, if the second node 14 determines that the endpoint discriminator is a match, the second node 14 can send (406) a responder message to the first node 12. In some cases, the second node 14 can respond to more than one endpoint discriminator. For example, the second node 14 can include a list of multiple different endpoint discriminators that are deemed to correspond to the client identity. In some cases, the second node 14 may apply an algorithm to determine whether the received endpoint discriminator corresponds to the host identity of the second node 14. For example, the second node 14 may include an algorithm which specifies that all endpoint discriminators beginning with "WXYZ/" match the client identity. The second node 14 may apply other tests to check the endpoint discriminator, as well.

Figure 6:
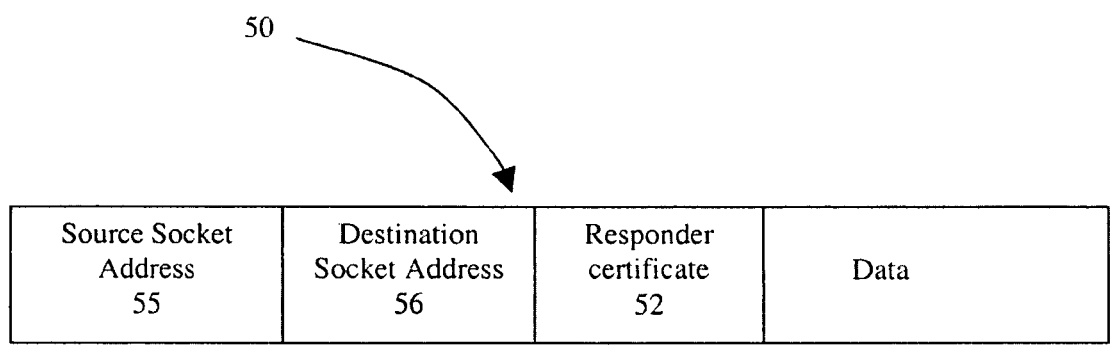
FIG. 6 is an example of a responder packet.

An example of a responder message 50 is shown in FIG. 6. The responder message 50 may be defined according to a protocol such as Media Flow Protocol (MFP). The responder message 50 includes, among other things, a responder certificate 52 which conveys the identity of the node that sent the responder message 50. In addition to the certificate 52, the message 50 can include data such as a source socket address 55 and a destination socket address 56.

The responder certificate 52 in the message 50 may correspond to an actual digital certificate or information representative of the second node 14, such as a character string identifying a user associated with the second node. In some cases, the responder certificate 52 is a generic certificate such that it represents, for example, a client with multiple different host identities. In some cases, the responder certificate 52 is customized to incorporate information such as a field that identifies the specific endpoint discriminator included in the startup message. In some implementations, the certificate 52 contains a field that identifies multiple endpoint discriminators in addition to the discriminator included in the startup message. Alternatively, or in addition, the certificate can include a flag that indicates information about the second node 14. For example, the flag can be a Boolean (yes/no) condition that specifies whether the node is a server or whether the node can respond to Hyper-Text-Transfer Protocol (HTTP). In some cases, the responder certificate 52 includes a copy of the endpoint discriminator that was sent in the startup message.

Referring again to FIG. 4, the first node 12, upon receiving the responder message, can verify (408) whether the responder message was sent from the responder node to which the connection is requested. To verify the source of the responder message, the first node 12 can check to see whether the responder message includes data/information that matches the endpoint discriminator sent in the startup message. For example, the responder message and/or responder certificate may include the aforementioned flag that lists the endpoint discriminator of the startup message. Alternatively, the responder message and/or responder certificate may include a copy of the endpoint discriminator sent in the startup message. In some cases, the source of the responder message may be verified by checking that a signature chain included in the message leads to a trusted authority. Other methods for verifying the source of the responder message may be used as well. If the responder message cannot be verified, the responder message can be discarded (409) such that no connection is established.

Upon verifying the authenticity of the responder message, the first node 12 can transform (410) the responder certificate into a canonical endpoint discriminator representative of the entity 22 on which the second node 14 is supported. Transformation of the responder certificate includes, for example, applying an algorithm to the responder certificate to produce the canonical node identity. In some cases, the algorithm can be a cryptographic hash algorithm. An example hash algorithm includes the hash algorithm defined in Federal Information Processing Standard 180-2 "Secure Hash Standard" SHA-256, which takes input messages of any length and produces a cryptographic digest of 256 bits. Once the canonical identity is obtained, it can be encoded to provide the canonical endpoint discriminator. For example, the canonical identity can be encoded as a length/tag/value unit. Alternatively, or in addition, the transformation can include parsing a multi-part responder certificate into individual responder certificates, in which one or more of the individual responder certificates corresponds to the canonical endpoint identifier. Other transformations can be applied to the responder certificate, as well.

The first node 12 then can check (412) whether there are any pre-established sessions that are associated with the same canonical endpoint discriminator. For example, the first node 12 can store a list of different canonical endpoint discriminators, in which each canonical discriminator is indexed to a different session currently established with the first node 12. The first node 12 then compares the recently obtained canonical discriminator to the values on the list to determine if a match exists.

Should a match exist, the first node then identifies the currently running session associated with the particular endpoint discriminator and can map (414) the host identity of second node 14 to that session. That is, a session between the first node 12 and second node 14 may be bound to the session indexed by the recently obtained canonical discriminator. The process of establishing a new separate session between the first node 12 and second node 14 then is terminated. Additional sessions between the first node 12 and other nodes may also be bound to the existing session if the other virtual nodes provide canonical endpoint discriminators that match the discriminator indexed to the existing session.

Accordingly, a single session may include multiple communication flows (i.e., a flow of communication between two nodes) each of which is independent of the other. However, each communication flow also can include metadata associated with it. Examples of metadata include a virtual host name as may have been included in the non-canonical endpoint discriminator, a numerical Real Time Media Flow Protocol (RTMFP) stream identifier, or a port number analogous to a TCP or UDP port number. Other metadata may be associated with each communication flow as well. As a result, the host (on which the session has been established) can tell the difference between two or more sets of flows by examining the metadata associated with a particular communication flow.

Although other protocols also may be used to connect to virtual hosts, the present protocol can provide increased communication efficiency and reduce the number of times that encryption needs to be applied to a communication flow. For example, when forming a connection to a virtual receiving host over HTTP, a new TCP session in addition to a secure socket layer handshake will have been established and negotiated, respectively, by the time the initiating node receives a responder message identifying the host identity.

If no match exists, a new session between the first node 12 and second node 14 can be established (416). The canonical endpoint discriminator obtained from transforming the responder certificate then can be indexed to the new session.

Figure 7:
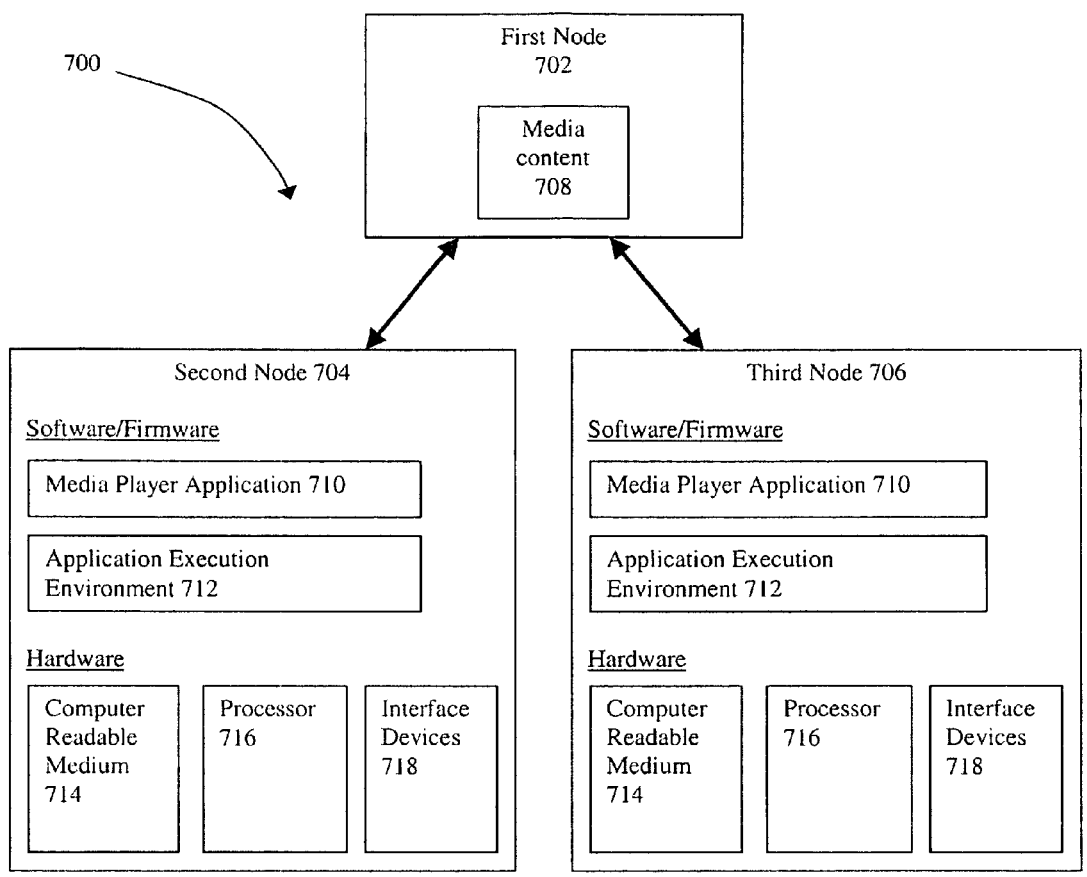
FIG. 7 is an example of a network environment.

FIG. 7 shows another example of a network environment 700 in which the host identities of one or more nodes can be mapped to a pre-established session. The network environment 700 includes a first node 702, a second node 704, and a third node 706. The first node 702 can be a server that provides media content 708 to the second and third nodes 704, 706. For example, the first node 702 can include a FLASH® Media Server program using RTMFP, in which a number of virtual hosts are each addressable at their own distinct endpoint discriminators, but the FLASH® Media Server core itself runs a single RTMFP instance. The media content 708 can include web applications, games and movies, and multimedia content for client computers (e.g., home personal computers, mobile phones, personal digital assistants, smart phones, or various embedded devices.)

The first, second and third nodes 702, 704, 706 can include software, firmware and hardware. The hardware can include a computer readable medium 714, a processor 716, and one or more interface devices 718. The computer readable medium 714 can include one or more hard drives, external drives, magnetic disks, optical disks, tape drives, memory devices, etc. The processor 716 can include one or more central processing units capable of interpreting computer program instructions and processing data, and each processing unit can include one or more processor cores. The interface devices 718 can include one or more display and audio devices (e.g., computer screens, computer monitors, digital displays, liquid crystal displays (LCDs), light emitting diodes (LEDs), etc.) and audio-capable components (e.g., microphones, speakers, etc.). The interface devices 718 can support a graphical user interface (GUI) by which the user sees, hears and experiences the output of a media player application 710 or application execution environment 712. For example, the media player application 710 can be a FLASH® Player program installed on a home computer or other device. The media player application can run in the application execution environment 712, which can be an operating system (OS) for the clients or server, or a cross-OS runtime environment installed on the clients or server, such as the Adobe Integrated Runtime (AIR™) environment available from Adobe System Incorporated of San Jose, Calif.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, mechanical or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   sending, from a first node to a second node, an initiator message to open a connection between the first node and the second node wherein the initiator message comprises an endpoint discriminator identifying the second node;
   receiving, at the first node, a responder message sent from the second node, wherein the responder message comprises a responder certificate;
   comparing information contained in the responder message with the endpoint discriminator provided in the initiator message;
   confirming that the responder certificate was sent by the second node when the information contained in the responder message matches the endpoint discriminator provided in the initiator message;
   converting the responder certificate to a responder canonical identifier;
   comparing the responder canonical identifier to a stored canonical identifier, wherein the stored canonical identifier is stored by the first node; and
   establishing the connection between the first node and the second node over a pre-existing session corresponding to the stored canonical identifier, when the responder canonical identifier matches the stored canonical identifier, wherein the pre-existing session is between the first node and a third node associated with the second node.

2. The method of claim 1, wherein converting the responder certificate comprises converting the responder certificate to the responder canonical identifier after confirming that the responder certificate was sent by the second node.

3. The method of claim 1, further comprising opening the connection between the first node and the second node in a new session, when the responder canonical identifier does not match the stored canonical identifier.

4. The method of claim 3, further comprising indexing the responder canonical identifier to the new session, when the responder canonical identifier does not match the stored canonical identifier.

5. The method of claim 3, further comprising terminating a session setup between the first node and the second node, when the responder canonical identifier matches the stored canonical identifier, and
   wherein the responder message is sent from the second node in response to receipt of the initiator message at the second node.

6. A computer program product, encoded on a non-transitory computer-readable medium, operable to cause data processing apparatus to perform operations comprising:
   sending, from a first node to a second node, an initiator message to open a connection between the first node and the second node, wherein the initiator message comprises an endpoint discriminator identifying the second node;

receiving, at the first node, a responder message sent from the second node, wherein the responder message comprises a responder certificate;

comparing information contained in the responder message with the endpoint discriminator provided in the initiator message;

confirming that the responder certificate was sent by the second node when the information contained in the responder message matches the endpoint discriminator provided in the initiator message;

converting the responder certificate to a responder canonical identifier;

comparing the responder canonical identifier to a stored canonical identifier, wherein the stored canonical identifier is stored by the first node; and establishing the connection between the first node and the second node over a pre-existing session corresponding to the stored canonical identifier, when the responder canonical identifier matches the stored canonical identifier, wherein the pre-existing session is between the first node and a third node associated with the second node.

7. The computer program product of claim 6, wherein the responder message comprises information matching the endpoint discriminator provided in the initiator message.

8. The computer program product of claim 6, wherein the responder canonical identifier comprises a cryptographic hash of the responder certificate.

9. The computer program product of claim 6, wherein comparing the responder canonical identifier comprises comparing the responder canonical identifier to multiple stored canonical identifiers indexed to multiple pre-existing sessions.

10. A system comprising:
a processor to transmit information to and receive information from a network; and
a non-transitory computer readable medium coupled with the processor and including instructions configured to cause the processor to perform operations comprising:
sending, from a first node to a second node, an initiator message to open a connection between the first node and the second node, wherein the initiator message comprises an endpoint discriminator identifying the second node;
receiving, at the first node, a responder message sent from the second node, wherein the responder message comprises a responder certificate;
comparing information contained in the responder message with the endpoint discriminator provided in the initiator message;
confirming that the responder certificate was sent by the second node when the information contained in the responder message matches the endpoint discriminator provided in the initiator message;
converting the responder certificate to a responder canonical identifier;
comparing the responder canonical identifier to a stored canonical identifier, wherein the stored canonical identifier is stored by the first node; and
establishing the connection between the first node and the second node over a pre-existing session corresponding to the stored canonical identifier, when the responder canonical identifier matches the stored canonical identifier, wherein the pre-existing session is between the first node and a third node associated with the second node.

11. The system of claim 10, wherein converting the responder certificate comprises converting the responder certificate to the responder canonical identifier after confirming that the responder certificate was sent by the second node.

12. The system of claim 10, wherein the computer readable medium includes instructions configured to cause the processor to perform operations further comprising opening the connection between the first node and the second node in a new session, when the responder canonical identifier does not match the stored canonical identifier.

13. The system of claim 12, wherein the computer readable medium includes instructions configured to cause the processor to perform operations further comprising indexing the responder canonical identifier to the new session, when the responder canonical identifier does not match the stored canonical identifier.

14. The system of claim 12, wherein the computer readable medium includes instructions configured to cause the processor to perform operations further comprising terminating a session setup between the first node and the second node, when the responder canonical identifier matches the stored canonical identifier.

15. The computer program product of claim 6, operable to cause data processing apparatus to perform operations further comprising opening the connection between the first node and the second node in a new session, when the responder canonical identifier does not match the stored canonical identifier.

* * * * *